United States Patent
Bender et al.

(10) Patent No.: US 7,062,814 B2
(45) Date of Patent: Jun. 20, 2006

(54) INFLATABLE COLUMN ASSEMBLY FOR A DOCK LEVELER

(75) Inventors: Brian Bender, Brookfield, WI (US); Grant Leum, Muskego, WI (US); Charles J. Digmann, Dubuque, IA (US); Lester W. Paul, Cedar Grove, WI (US); Norbert Hahn, Franklin, WI (US); Pamela Pietrangelo, Oak Creek, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 140 days.

(21) Appl. No.: 10/140,786

(22) Filed: May 6, 2002

(65) Prior Publication Data

US 2003/0204921 A1 Nov. 6, 2003

(51) Int. Cl.
*E01D 1/00* (2006.01)

(52) U.S. Cl. .................................................. 14/71.3
(58) Field of Classification Search ............... 14/69.5, 14/71.1, 71.31, 71.5; 298/22 R
See application file for complete search history.

(56) References Cited

U.S. PATENT DOCUMENTS

| 1,421,901 A | 7/1922 | Brotsch |
| 1,868,935 A | 10/1928 | Breneman |

(Continued)

FOREIGN PATENT DOCUMENTS

| AU | 579830 | 1/1985 |
| AU | 588734 | 1/1989 |
| DE | 165168 | 11/1905 |
| DE | 1 207 221 | 12/1965 |
| DE | 27 21 384 | 11/1978 |
| DE | 82 20 586 | 8/1982 |
| DE | 89 08 188 | 8/1989 |

(Continued)

OTHER PUBLICATIONS

Hinged–Lip Adjustable Dock Levelers, Industry's First Mechanical Dock Leveler, Bulletin No. HLB–68–2, Rite–Hite Corporation (4 pages) (1968).
Rite–Hite Semi–Automatic Dock Leveler Specifications and Pit Details (2 pages) (1980).
Installation Instructions, Kelley Dyna–Load Hydraulic Dockleveler, Kelley Company, Inc. (5 pages) (Mar. 1, 1980).
Installation Instructions and Owners Manual, Kelley Dyna–Load Mechanical Dockleveler, Kelley Company, Inc. (5 pages) (May 10, 1978).
Loading Dock Accessories, Kelley Company, Inc. (1 page) (1983).
Kelley E–Z Clean Hydraulic Dock Levelers; 1 page (1980).

*Primary Examiner*—Alexandra Pechhold
(74) *Attorney, Agent, or Firm*—Hanley, Flight & Zimmerman LLC.

(57) ABSTRACT

A dock leveler for a truck loading dock includes a pivotal deck that is actuated by an inflatable column assembly. The inflatable column assembly includes a pliable tube that when inflated has a generally vertical cylindrical shape that can provide a heavy deck with substantial columnar support. The shape and orientation of the column assembly is such that the lengths of the pliable tube's seams are minimized. A pliable fabric sheet held in tension against the underside of the deck provides a generally flat, broad surface against which the pliable tube can push as the inflatable column assembly pushes the deck upward. A footed pallet underneath the pliable tube can be banded to the deck during shipment. After installation, the pallet can be readily lifted for cleaning the pit floor underneath the pallet.

54 Claims, 16 Drawing Sheets

U.S. PATENT DOCUMENTS

| | | | | |
|---|---|---|---|---|
| 2,070,960 A | | 1/1936 | Phillips | |
| 2,689,965 A | | 9/1954 | Fenton | |
| 2,846,703 A | | 9/1955 | Adley | |
| 3,379,411 A | * | 4/1968 | Vanderjagt | 254/93 R |
| 3,493,984 A | | 4/1968 | Reinhard | |
| 3,521,861 A | * | 7/1970 | Freudenthal et al. | 254/93 L |
| 3,659,899 A | * | 5/1972 | Phillips et al. | 298/22 R |
| 3,675,377 A | | 7/1972 | Suter | |
| 3,763,514 A | | 10/1973 | Bishop | |
| 3,784,255 A | * | 1/1974 | Smock | 298/8 T |
| 3,822,861 A | | 7/1974 | Scott | |
| 3,902,213 A | | 9/1975 | Pfleger et al. | |
| 3,997,932 A | | 12/1976 | Artzberger | |
| RE29,302 E | | 7/1977 | De Lepeleire | |
| 4,036,472 A | | 7/1977 | Orndorff, Jr. | |
| 4,060,170 A | | 11/1977 | Walters | |
| 4,097,949 A | | 7/1978 | Barrett | |
| 4,118,817 A | | 10/1978 | Burnham | |
| 4,149,469 A | | 4/1979 | Bigler | |
| 4,156,974 A | | 6/1979 | Huang | |
| 4,293,969 A | * | 10/1981 | Frommelt | 14/71.1 |
| 4,319,666 A | | 3/1982 | Hunter | |
| 4,455,703 A | | 6/1984 | Fromme et al. | |
| 4,470,578 A | | 9/1984 | Arvidsson et al. | |
| 4,572,579 A | * | 2/1986 | Saito | 298/1 A |
| 4,630,989 A | | 12/1986 | Davey | |
| 4,688,760 A | * | 8/1987 | Garman et al. | 254/93 HP |
| 4,722,655 A | | 2/1988 | Bonerb | |
| 4,735,457 A | | 4/1988 | Bonerb et al. | |
| 4,776,052 A | | 10/1988 | Delgado et al. | |
| 4,782,542 A | | 11/1988 | Sato | |
| 4,784,567 A | | 11/1988 | Hageman et al. | |
| 4,845,792 A | | 7/1989 | Bakula et al. | |
| 4,854,801 A | | 8/1989 | Bonerb | |
| 4,861,215 A | | 8/1989 | Bonerb | |
| 4,900,217 A | | 2/1990 | Nelson | |
| 4,948,107 A | | 8/1990 | Orndorff, Jr. | |
| 5,022,809 A | | 6/1991 | Hinson | |
| 5,042,103 A | * | 8/1991 | Megens | 14/71.7 |
| 5,067,774 A | * | 11/1991 | Trowland | 298/1 A |
| 5,068,938 A | | 12/1991 | Roscoe | |
| 5,090,773 A | | 2/1992 | Guillaume | |
| 5,267,447 A | * | 12/1993 | Yamamoto | 62/50.7 |
| 5,414,886 A | | 5/1995 | Sust et al. | |
| 5,446,938 A | * | 9/1995 | Warner et al. | 14/71.3 |
| 5,450,643 A | * | 9/1995 | Warner | 14/69.5 |
| 5,471,693 A | * | 12/1995 | Hodges | 14/71.3 |
| 5,475,888 A | * | 12/1995 | Massey | 14/69.5 |
| 5,481,774 A | * | 1/1996 | Hodges et al. | 14/71.7 |
| 5,500,968 A | * | 3/1996 | Hodges | 14/71.7 |
| 5,522,107 A | * | 6/1996 | Hageman et al. | 14/69.5 |
| 5,522,108 A | * | 6/1996 | Massey et al. | 14/71.7 |
| 5,522,678 A | | 6/1996 | Marshall et al. | |
| 5,560,684 A | * | 10/1996 | Gilmore | 298/22 R |
| 5,564,238 A | | 10/1996 | Ellis | |
| 5,600,859 A | * | 2/1997 | Hodges et al. | 14/71.1 |
| 5,621,938 A | * | 4/1997 | Warner | 14/69.5 |
| 5,651,155 A | * | 7/1997 | Hodges et al. | 14/71.3 |
| 5,690,314 A | | 11/1997 | Williams | |
| 5,802,650 A | * | 9/1998 | Massey et al. | 14/71.3 |
| 5,802,651 A | * | 9/1998 | Massey et al. | 14/71.3 |
| 5,832,554 A | | 11/1998 | Alexander | |
| 5,975,643 A | * | 11/1999 | Smith et al. | 298/22 R |
| 5,996,156 A | * | 12/1999 | Massey | 14/71.3 |
| 6,216,303 B1 | * | 4/2001 | Massey | 14/71.3 |
| 6,240,587 B1 | * | 6/2001 | Meichtry et al. | 14/69.5 |
| 6,267,448 B1 | * | 7/2001 | Hendry et al. | 298/22 R |
| 6,286,812 B1 | * | 9/2001 | Cherry | 254/9 C |
| 6,360,393 B1 | * | 3/2002 | Fritz | 14/69.5 |
| 6,460,212 B1 | * | 10/2002 | Massey et al. | 14/71.3 |
| 2002/0035760 A1 | | 3/2002 | Massey et al. | |

FOREIGN PATENT DOCUMENTS

| | | |
|---|---|---|
| EP | 0 001 316 | 1/1982 |
| EP | 0 857 672 | 8/1998 |
| EP | 0 721 423 | 1/1999 |
| EP | 0 721 422 | 4/1999 |
| GB | 930163 | 7/1963 |
| GB | 161243 | 7/1964 |
| GB | 2023231 | 12/1979 |
| GB | 2 145 041 | 3/1985 |
| GB | 2 316 715 | 3/1998 |
| NL | 7710543 | 3/1979 |
| SU | 931 701 | 6/1982 |
| SU | 1362826 | 12/1987 |
| WO | WO 90/11204 | 10/1990 |
| WO | WO 95/09790 | 4/1995 |
| WO | WO 95/09791 | 4/1995 |
| WO | WO 95/09792 | 4/1995 |
| WO | WO 00/26471 | 5/2000 |

* cited by examiner

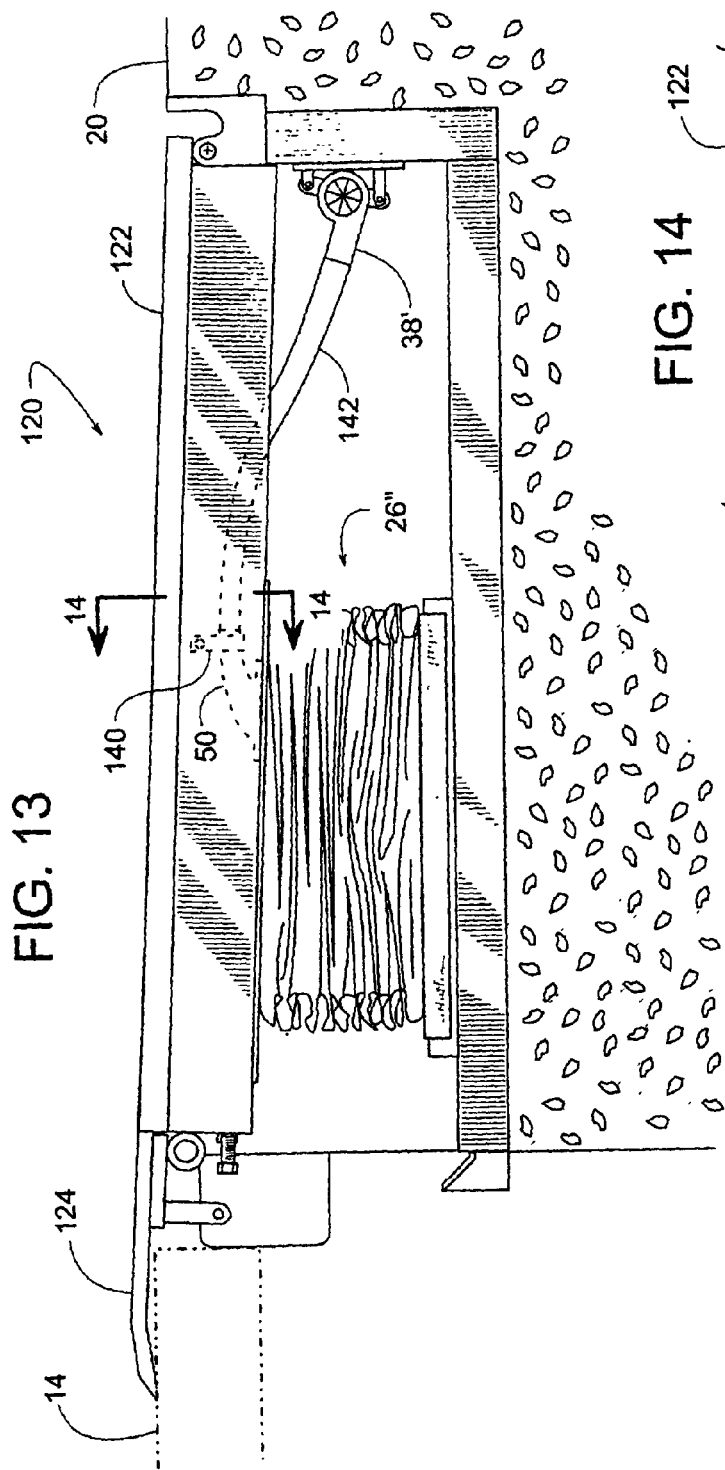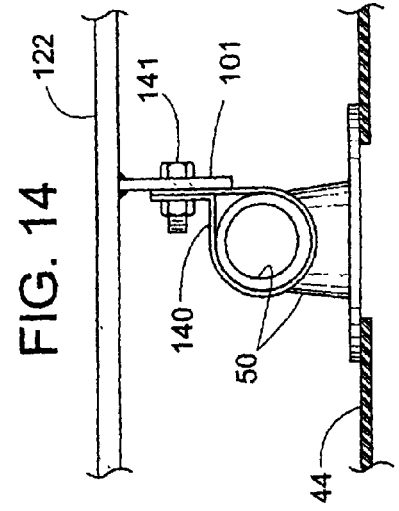

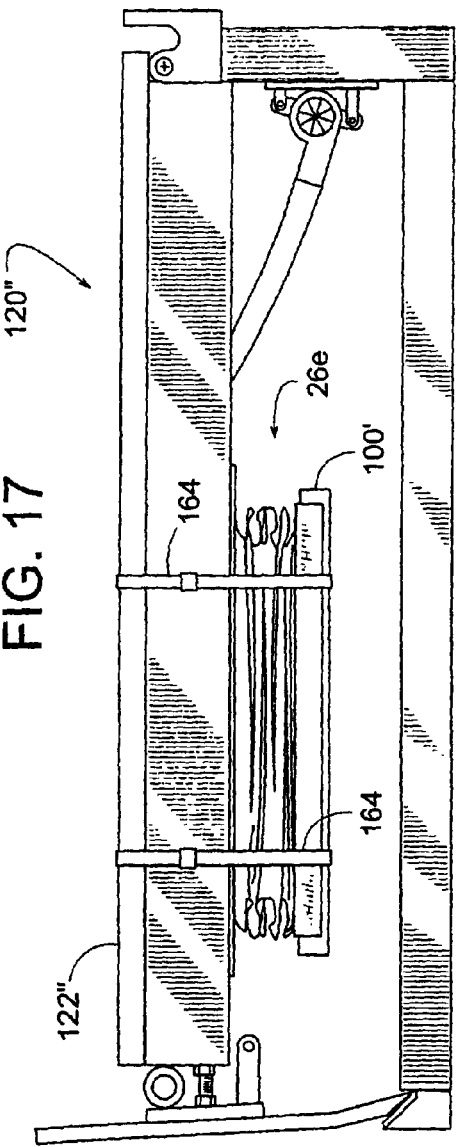
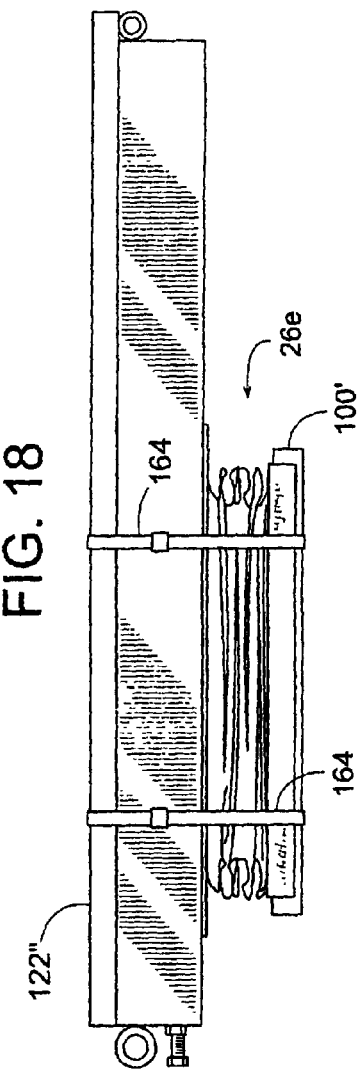

INFLATABLE COLUMN ASSEMBLY FOR A DOCK LEVELER

BACKGROUND OF THE INVENTION

1. Field of the Invention

The subject invention generally relates to dock levelers, and more specifically to a dock leveler whose deck is raised by an inflatable member.

2. Description of Related Art

Loading docks often include a dock leveler to facilitate the loading or unloading of a truck's cargo. The dock leveler provides a bridge that material handling equipment and personnel can use to travel between a loading dock platform and the bed of the truck. Dock levelers usually include a deck or ramp that can pivot about its rear edge to raise or lower its front edge. Often a lip plate extends from the front edge of the deck and is adapted to engage the rear of the truck bed. The lip plate is usually movable between a stored, retracted position and an extended, vehicle-engaging position. The pivotal movement of the deck enables the dock leveler to set the lip plate on or remove it from the truck bed.

To pivot a deck, a dock leveler usually includes some type of actuator that extends, expands or otherwise moves to force the deck upward. Downward movement of the deck may be achieved by relying on weight of deck or by physically pushing the deck back down by way of an external force or weight, such as the weight of a person standing on the deck.

There are currently a variety of well-known actuators available. Some common ones include, hydraulic cylinders, pneumatic cylinders, coil springs, high-pressure air springs, linear motors, and inflatable actuators. Each has their advantages and features that may be preferred by the end user for various reasons, such as cost, reliability, durability, appearance, safety, and strength or power to lift a particular deck. The various actuators may also have their limitations.

For example, some inflatable bag actuators provide limited deck-lifting force due the strength or shape of the actuator's inflatable bag. A bag's lifting force is, in part, a function of the air pressure within the bag and the contact area between the bag and the underside of the deck. A bag's strength may be limited by not only the strength of the bag's material, but also the strength of the seams that hold the bag together. A bag may experience the highest stress adjacent the maximum cross-sectional area of the bag's internal volume. In cases where the maximum cross-sectional area is significantly greater than the contact area between the bag and the deck, the maximum stress on the bag may be unnecessarily high at the bag's maximum cross-sectional area. The bag's strength may be further weakened if the bag's seams are adjacent that cross-sectional area. Examples of such bag designs appear to be disclosed (i.e., the disclosure is of limited detail) in the following U.S. Pat. Nos. 6,216,303; 5,651,155; 5,500,968; 5,481,774; 5,471,693 and 5,446,938.

Since the underside of dock leveler's deck often includes spaced apart support beams, a generally rigid load-supporting plate may need to be attached to the beams to provide a broad, flat surface against which the bag may push. Such a support plate, as disclosed in U.S. Pat. Nos. 5,522,108 and 5,802,651, not only adds cost to the dock leveler, but also adds to the weight of the deck and thus adds to the weight the bag must lift. A similar plate is also disclosed in U.S. Pat. Nos. 6,267,447 and 6,267,448.

SUMMARY OF THE INVENTION

In some embodiments, a dock leveler includes a pivotal deck that is lifted by an inflatable column assembly that is generally cylindrical when inflated by a blower.

In some embodiments, the inflatable column assembly includes a taut pliable sheet attached to the underside of the deck. The sheet provides the inflatable column assembly with a broad surface against which to push, as opposed to the column assembly having to push against the deck's spaced support beams.

In some embodiments, the inflatable column assembly is provided with seams that are sized or positioned to avoid unnecessary stress on the seams.

In some embodiments, the inflatable column assembly has a generally circular base and a generally elliptical top to provide a lifting member that is generally vertical and cylindrical.

In some embodiments, the inflatable column assembly is inflated through a nozzle having a diverging airflow passageway.

In some embodiments, the nozzle includes an air passageway that curves smoothly between an obtuse angle.

In some embodiments, the blower that inflates the column assembly is pivotally attached to a hinge of the dock leveler's deck, thereby providing a flexible point of attachment.

In some embodiments, the blower is mounted at a substantially fixed location.

In some embodiments, a flexible tube connects the blower to a nozzle, wherein the blower is stationary and the nozzle is fixed to the deck.

In some embodiments, the blower is attached to a mounting plate that protects the blower from impact during shipment and installation.

In some embodiments, the dock leveler includes a lip that extends linearly relative to the deck.

In some embodiments, the dock leveler includes a lip that pivots relative to the deck.

In some embodiments, the dock leveler includes a lip that pivots and slides relative to the deck.

In some embodiments, the inflatable column assembly comprises a pliable tube that includes a peripheral flange made up of a plurality of outwardly extending tabs that allow the tube to be sewn to another sheet of material.

In some embodiments, an inflatable column assembly includes a footed pallet that can be lifted from a fixed surface underneath the pallet.

In some embodiments, a dock leveler includes a hanger that can hold an inflatable column assembly in a raised position.

In some embodiments, an inflatable column assembly is banded to the deck of a dock leveler to facilitate shipping and handling.

BRIEF DESCRIPTION OF THE DRAWINGS

FIG. 13 is similar to FIG. 11, but with the deck of the dock leveler resting upon the rear of a truck bed.

FIG. 14 is a cross-sectional view taken along line 14—14 of FIG. 13.

FIG. 17 is a side view of a dock leveler in a shipping and handling configuration.

FIG. 18 is a side view of another shipping and handling configuration

DESCRIPTION OF THE PREFERRED EMBODIMENT

Figure 1:
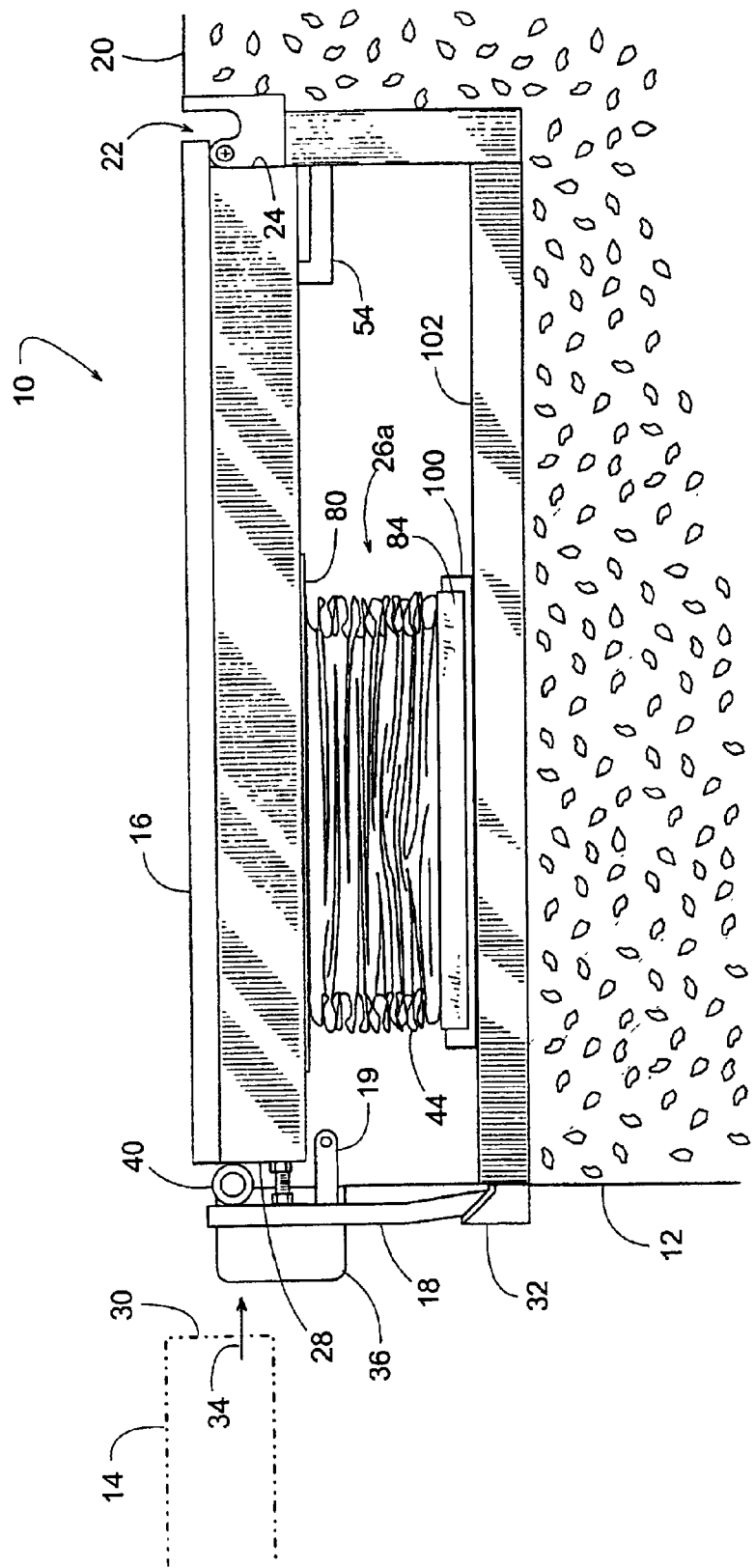
FIG. 1 is a side view of a dock leveler whose deck, shown in a cross-traffic position, is actuated by an inflatable column assembly.

FIGS. 1–4 show various operating positions of a dock leveler 10, which is installed at a loading dock 12 so a vehicle 14 (e.g., truck, trailer, etc.) can be readily loaded or unloaded of its cargo. Dock leveler 10 includes a pivotal deck 16 with a lip extension 18 that together provide a path for personnel and material handling equipment to travel between a platform 20 of the dock and vehicle 14. A hinge 22 adjacent a back edge 24 of deck 16 allows an inflatable column assembly 26a to pivot deck 16, thereby raising or lowering a front edge 28 of the deck, which enables the Lip 18 extends from deck 16 to bridge the gap between front edge 28 and a rear edge 30 of vehicle 14.

The sequence of operation at dock 12 typically begins with dock leveler 10 at its stored, cross-traffic position, as shown in FIG. 1. In this position, inflatable column assembly 26a is deflated, lip 18 is at its pendant position supported by a set of lip keepers 32, and the top surface of deck 16 is generally flush with platform 20. Arrow 34 represents vehicle 14 backing the rear edge of it truck bed toward a bumper 36 of dock 12.

Figure 2:
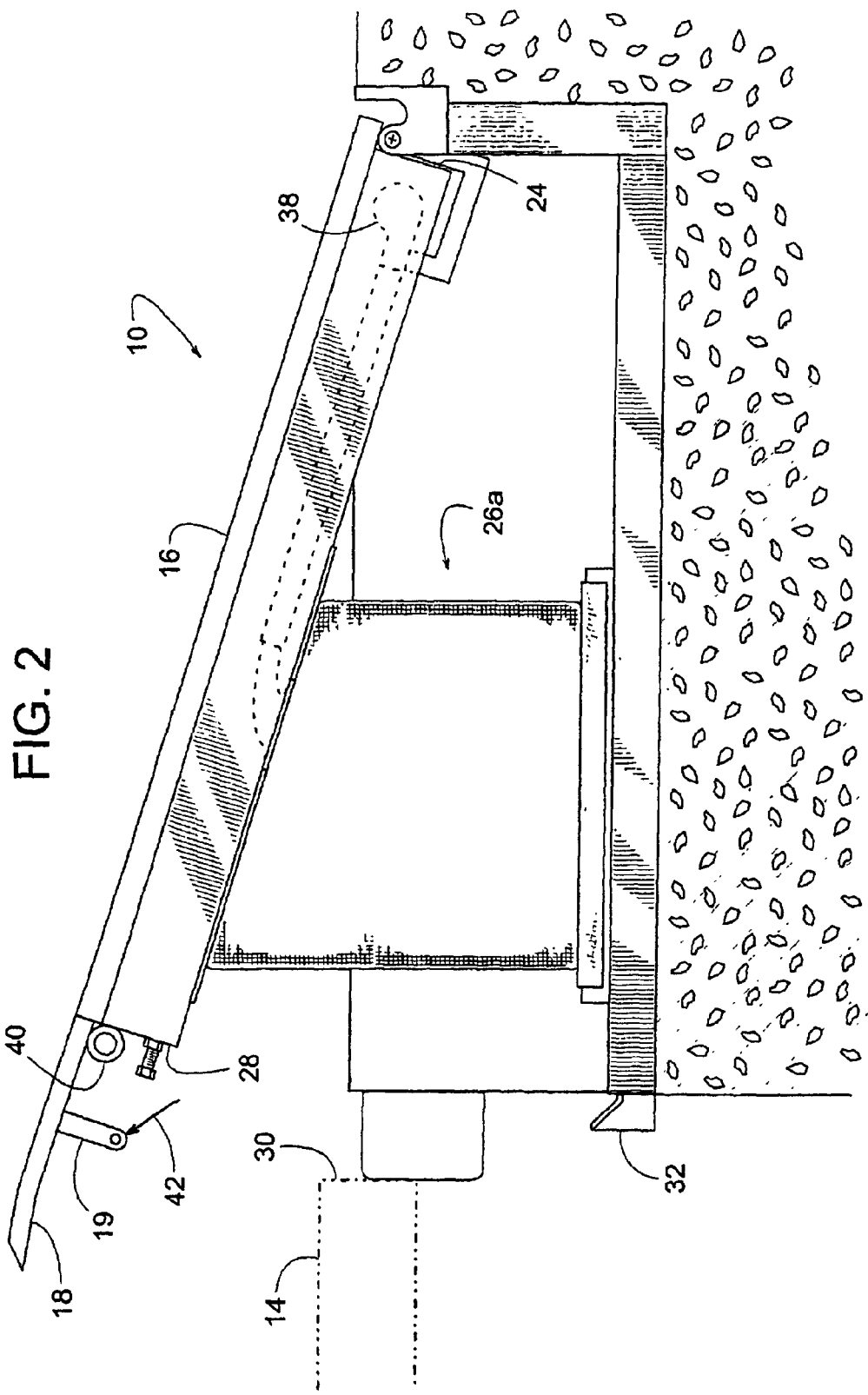
FIG. 2 is similar to FIG. 1, but with the inflatable column assembly inflated to lift the deck.
Figure 3:
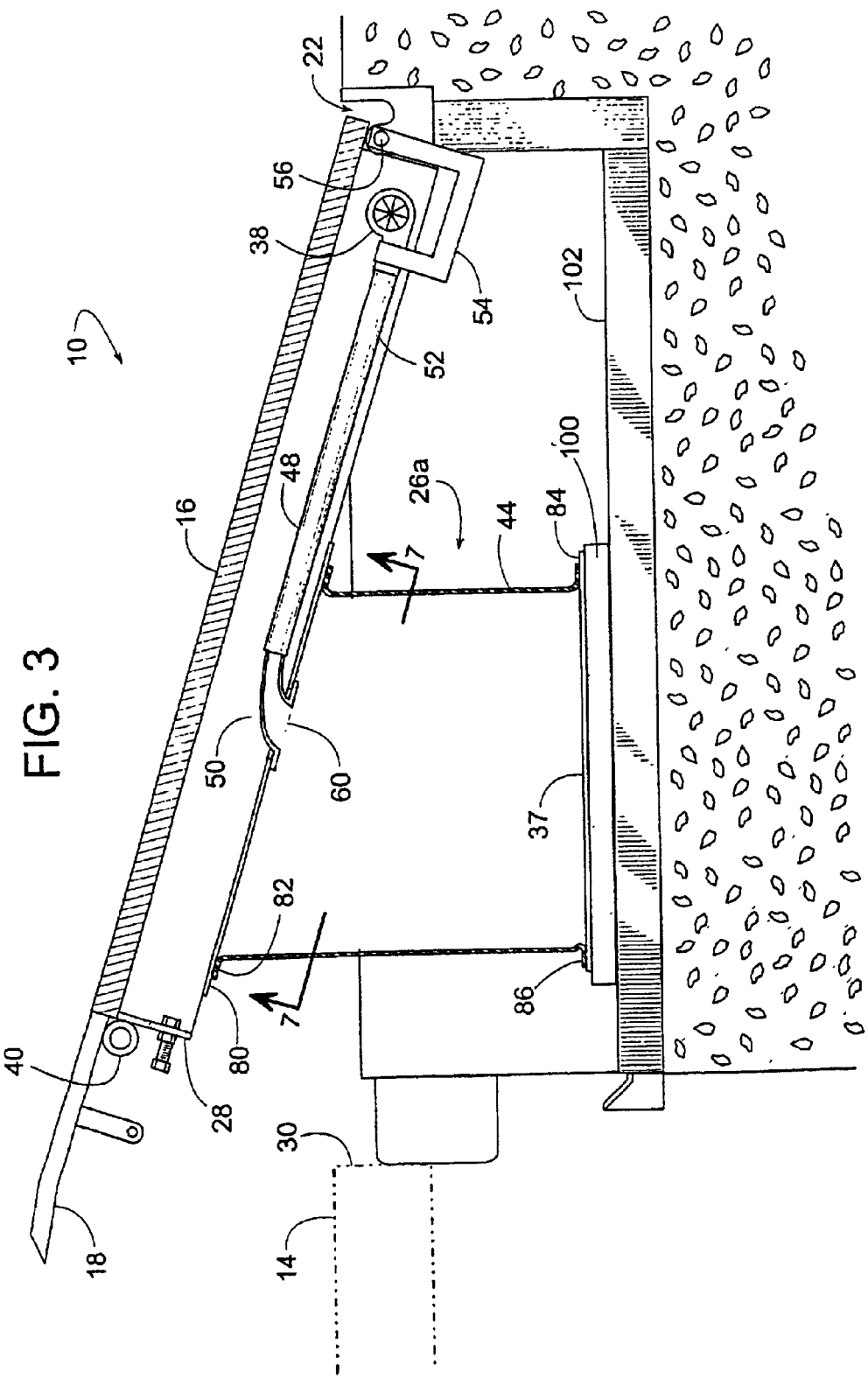
FIG. 3 is a cross-sectional view taken along line 3—3 of FIG. 6.

Next, in FIGS. 2 and 3, a source of pressurized air, such as a blower 38 is energized to inflate column assembly 26a. The source of pressurized air preferably delivers low-pressure air (i.e., less than 10 psig). A centrifugal blower is one example of a source of low-pressure air. As inflatable column assembly 26a expands, it forces deck 16 upward. Lip 18, which a hinge 40 pivotally connects to front edge 28 of deck 16, pivots outward to extend out over the truck bed of vehicle 14. Arrow 42 of FIG. 2 schematically represents any actuator able to move lip 18 (e.g., by acting upon a lug 19 fixed to lip 18). Examples of such a lip actuator include, but are not limited to, hydraulic cylinders, pneumatic cylinders, low-pressure air actuator, coil springs, high-pressure air springs, linear motors, mechanical linkages responsive to the movement of deck 16, and various combinations thereof.

Figure 4:
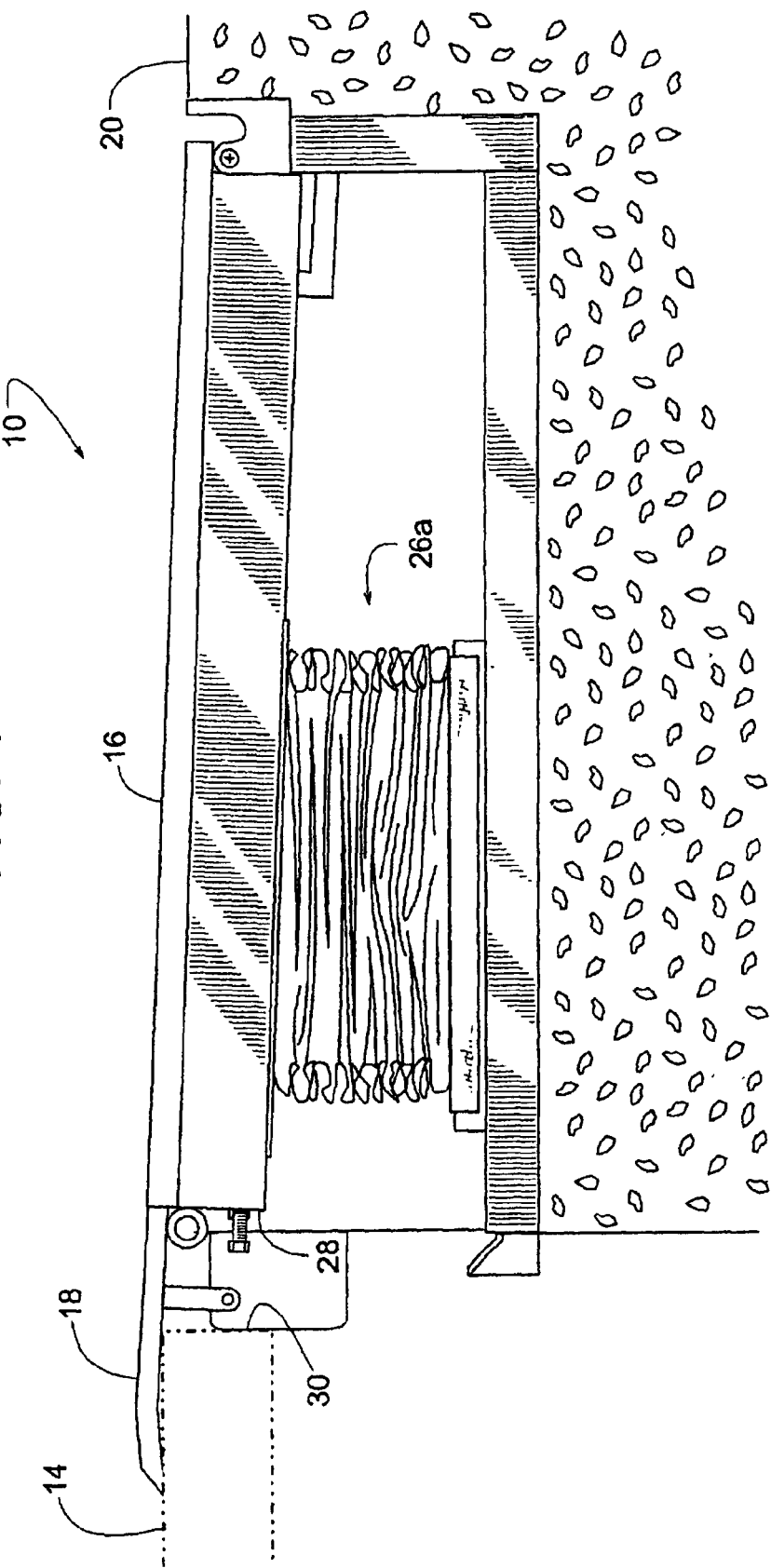
FIG. 4 is similar to FIG. 1, but with the deck of the dock leveler resting upon the rear of a truck bed.

After lip 18 is extended out over rear edge 30 of vehicle 14, blower 38 is de-energized to deflate column assembly 26a. This allows deck 16 to descend and lip 18 to rest upon the truck bed of vehicle 14, as shown in FIG. 4. In this position, cargo can be readily added or removed from vehicle 14.

To enable inflatable column assembly 26a to raise and lower deck 16, the column assembly comprises a pliable tube 44 sealed about its perimeter to an upper pliable sheet 80 and a lower pliable sheet 84, as shown in FIG. 3. According to this embodiment, the "sealing" of the pliable tube to the upper and lower pliable sheets is achieved by sewing. Other means of sealing could also be employed, including by way of example and not limitation, heat sealing and RF welding. Moreover, it is also possible that the pliable tube and the upper and lower pliable sheets could be integrally formed. In the case of sealing the tube and sheets together, the sealing mechanism that can be employed may be dependent on the material properties of the fabric from which the tube and sheets are formed. It will also be appreciated that different sealing mechanisms may provide different levels of sealing. In the case of the pliable tube and sheets being sewn together, some leakage of air past this seal may occur without negatively impacting the operation of the inflatable column assembly 26a. To introduce or exhaust air from within an internal volume of pliable tube 44, a nozzle 50 is attached to upper pliable sheet 80. Nozzle 50 includes a flange 62 (FIG. 5) that is fused, bonded or otherwise attached to upper sheet 80 around a hole 60 in sheet 80. Flange 62 may be attached to either side of upper sheet 80. According to the preferred embodiment, flange 62 is RF welded to the inside (i.e. internal to the tube 44 when assembled) of upper sheet 80, as seen most clearly in FIG. 5.

To inflate pliable tube 44, blower 38 forces air in series through a blower outlet 52, a tubular member 48, nozzle 50 and through hole 60 in pliable tube 44. As tube 44 inflates, it pushes deck 16 upward. To lower deck 16 back down, blower 38 is de-energized, which allows the deck's weight to push the air back out of pliable tube 44. The air escapes to atmosphere by exhausting in series flow back through nozzle 50, tubular member 48 and blower 38 (causing the blower to back spin). The resulting flow resistance provides deck 16 with a controlled descent. In some embodiments, a bracket 54 couples blower 38 to a hinge pin 56 of hinge 22 so that the movement of blower 38 tracks the pivotal movement of the deck 16 of dock leveler 10. According to this tracking feature, the blower 38 will pivot about hinge pin 56 as the deck pivots about that same hinge pin. Typically, however, slack in the connection between the blower 38 and the inflatable column assembly 26a (such connection to be described in greater detail below), will result in the blower pivoting at a slower rate than the deck 16, and thus pivoting through less of an arc for a given arc of deck movement. The benefit of the pivotal mounting of the blower 38 in this manner is that it reduces strain in the tubing or conduits connecting the blower to the inflatable column assembly 26a, given that relative movement between the deck 16 and the blower 38 is minimized by pivotally mounting the blower.

Figure 5:
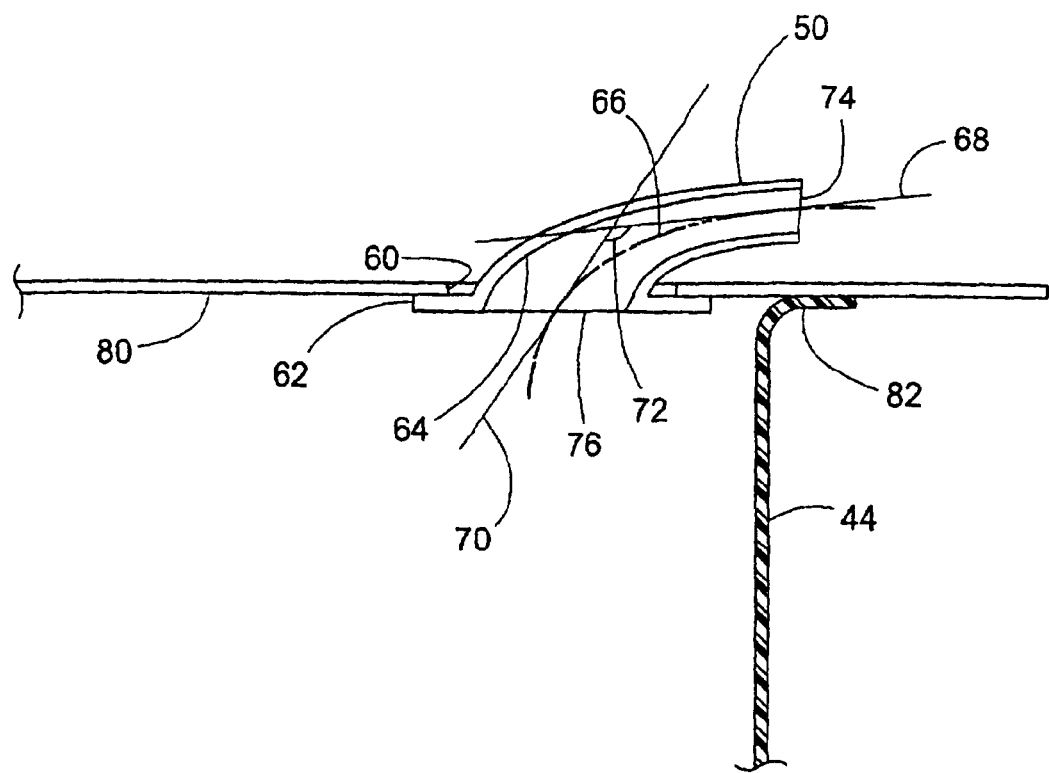
FIG. 5 is a cross-sectional view taken along line 5—5 of FIG. 6.

To promote airflow, nozzle 50 includes a smoothly curved and diverging air passageway 64, as shown in FIG. 5. A centerline 66 of air passageway 64 preferably curves so an air entry path 68 and an air exit path 70 define an obtuse angle 72, as opposed to a sharp right angle. The air passageway 64 diverging from an inlet 74 to an outlet 76 improves the flow of air into pliable tube 44, thereby increasing the speed at which deck 16 can be lifted for any given capacity blower.

Figure 6:
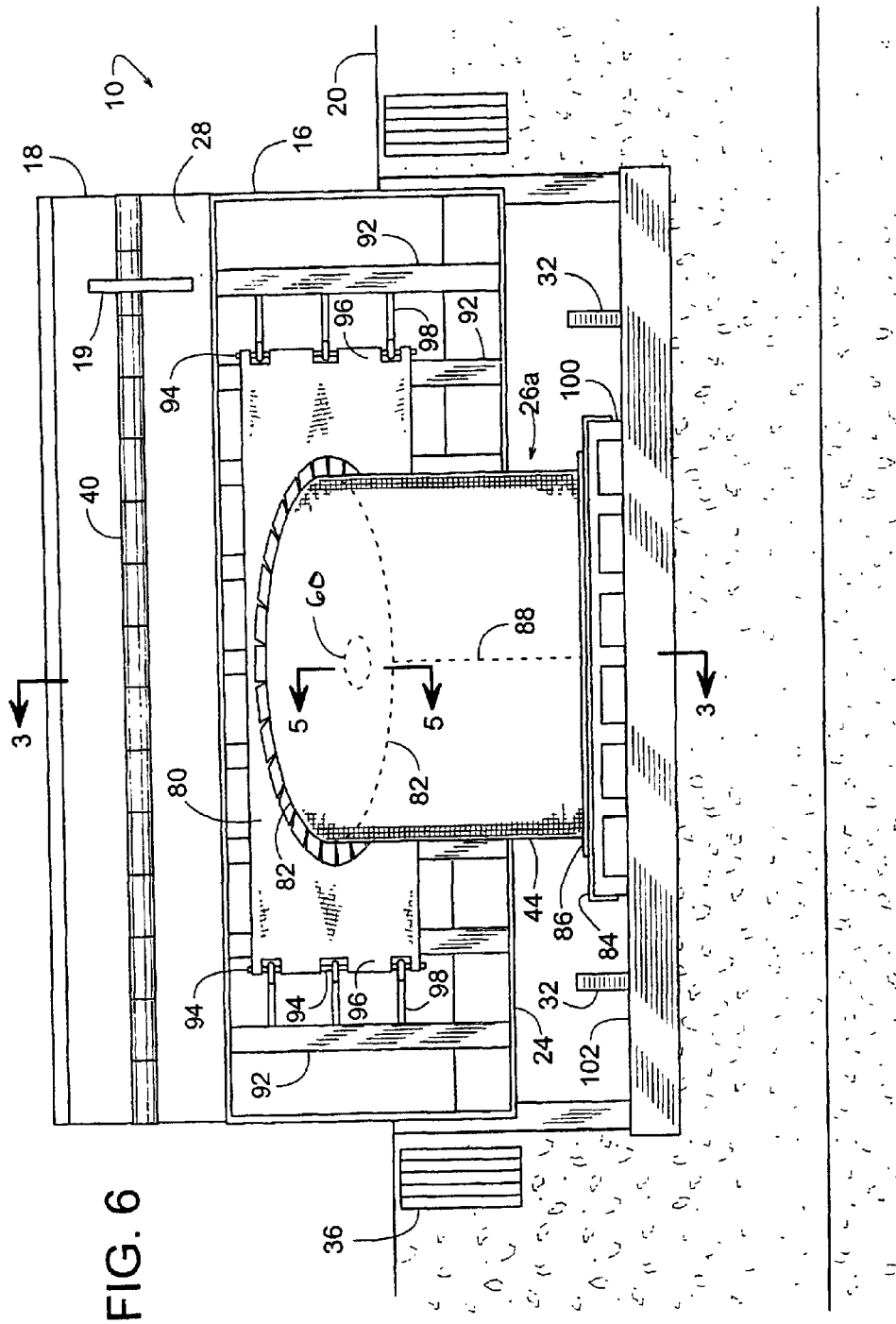
FIG. 6 is a front view of the dock leveler in its raised position of FIG. 2.

To improve the burst strength, durability, appearance, and columnar support strength of inflatable column assembly 26a, pliable tube 44 may preferably be made of a tough nylon material that provides a generally vertical cylinder when inflated. Preferably, the pliable tube is formed of an 11 oz./sq. yd. plain woven nylon that is preferably 2-side coated with a sealant coating such as polyurethane for a total fabric weight of 32 oz./sq. yd. The coating reduces the porosity of the base cloth forming the pliable tube. The upper pliable sheet 80 and lower pliable sheet 84 may be formed of the same material as pliable tube 44, or different material. According to the preferred embodiment, the upper pliable sheet 80 is a 6 oz./sq. yd. Nylon base material, that is vinyl-coated for a total fabric weight of 40 oz./sq. yd., while the lower pliable sheet 84 is a 6 oz./sq. yd. polyester base material, that is vinyl-coated for a total fabric weight of 40 oz./sq. yd. Referring to FIG. 6, pliable tube 44 is attached to upper pliable sheet 80 along an upper perimetric seam 82 (e.g., sewn joint), and is attached to lower pliable sheet 84 along a lower perimetric seam 86. In cases where pliable tube 44 is cylindrical and vertical, lower perimetric seam 86 is generally circular, and upper perimetric seam 82 is generally elliptical. In cases where tube 44 is cylindrical but set at an angle (e.g., embodiment of FIG. 9), both the lower and upper perimetric seams may be elliptical. Or, when an expanded outer tube is generally perpendicular to the deck, the upper perimetric seam may be circular and the lower seam may be elliptical. To minimize potential areas of leakage, a longitudinal seam 88 of pliable tube 44 is positioned where its length is minimized, i.e., positioned away from front edge 28 of deck 16.

Figure 7:
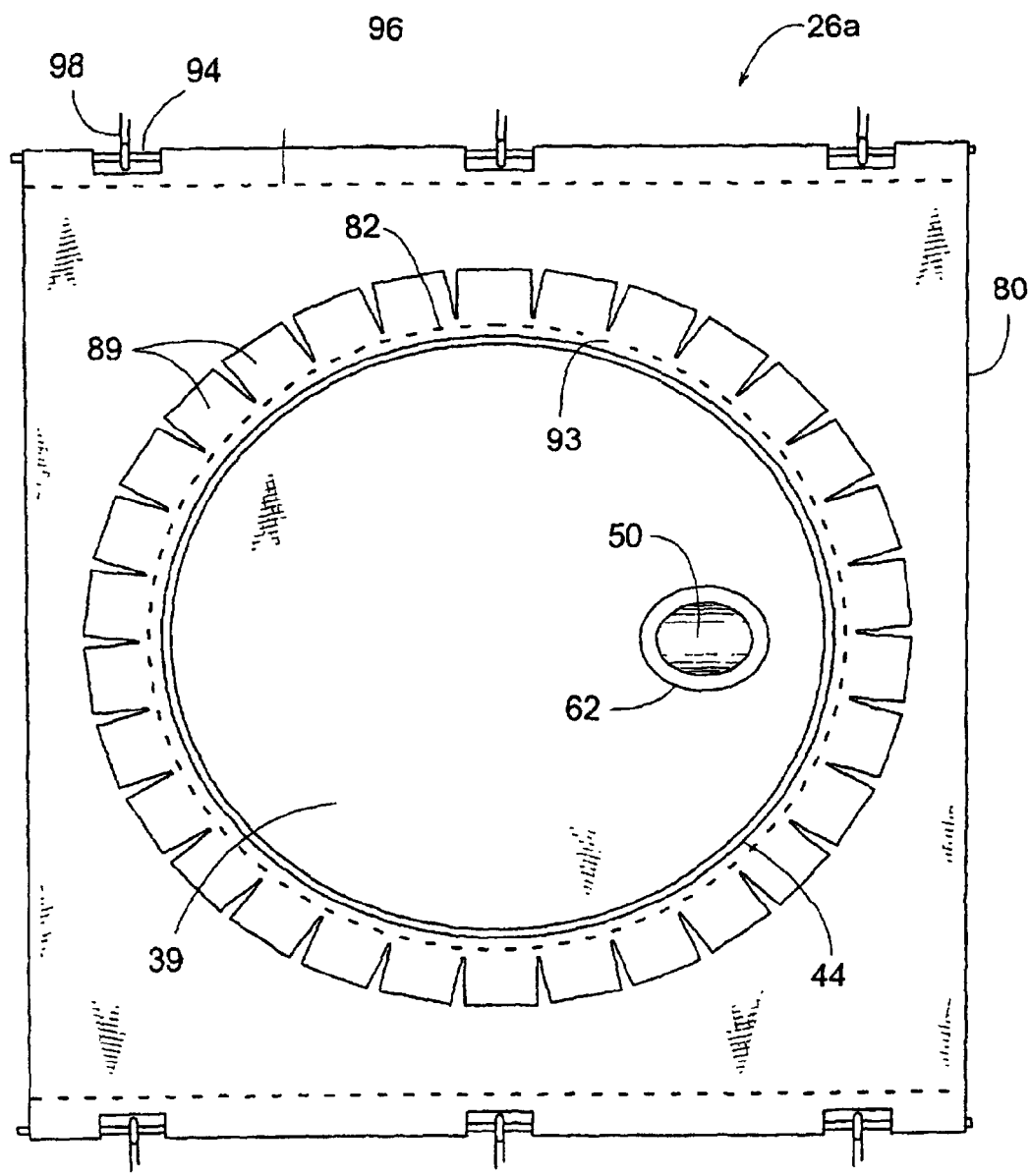
FIG. 7 is a cross-sectional view taken along line 7—7 of FIG. 3.

Referring to FIG. 7, pliable tube 44 may advantageously be joined to upper sheet 80 by first slitting the perimeter of pliable tube 44 at numerous points to increase the flexibility of tube 44 around its perimeter. The slits create a series of peripheral tabs 89 that can be easily folded outward to create a flange 93. Flange 93 of pliable tube 44 can then be readily sewn to upper sheet 80 along perimetric seam 82, thereby defining an upper surface 39 that is generally elliptical. Pliable tube 44 can be sewn to lower sheet 84 in a similar manner to define a lower surface 37 that is generally round.

Upper sheet 80 is held in tension across several support beams 92 of deck 16, thereby providing inflatable column assembly 26a with a broad surface against which pliable tube 44 may push up against deck 16. If sheet 80 were not held in tension, its pliability may allow the inflated column assembly 26a to squeeze between the deck's spaced support beams 92. Upper sheet 80 is preferably made of the same or similar pliable sheet material as tube 44. This not only minimizes the weight load on inflatable column assembly 26a but also provides column assembly 26a with a minimal collapsed height when deflated.

Upper sheet 80 can be held in tension in a variety of ways. For example, steel support bars 94 could be held within hems 96 sewn along either side of upper sheet 80, as shown in FIGS. 6 and 7. Anchors 98 can then connect bars 94 to support beams 92 or another part of deck 16. Anchors 98 are schematically illustrated to represent any connector that can hold upper sheet 80 taut across the underside of deck 16. Examples of anchor 98 include, but are not limited to, an eyebolt, turnbuckle, wire, strap, hook, chain, etc.

Lower sheet 84 of inflatable column assembly 26a can also be made of the same or similar pliable sheet material as tube 44. Lower sheet 84 is preferably attached to a footed pallet 100 that rests atop a bottom surface 102 of dock leveler 10 or rests at the bottom of a pit within which a dock leveler is installed. The term, "footed pallet" refers to any support member having one or more bottom support surfaces (preferably spaced apart) that are substantially stationary relative to the pallet itself (e.g., not supported by rollers). Lower sheet 84 can be attached to pallet 100 in any conventional manner including, but not limited to, wire ties through holes in the pallet 100 and the lower sheet 84, stapling, sewing, gluing, screwing, nailing, etc. By not having pallet 100 fixed or attached to surface 102, pallet 100 is free to settle to its naturally central position, where pliable tube 44 assumes a generally vertical orientation. In addition, pallet 100 can be readily lifted manually for periodic cleaning of bottom surface 102.

Figure 8:
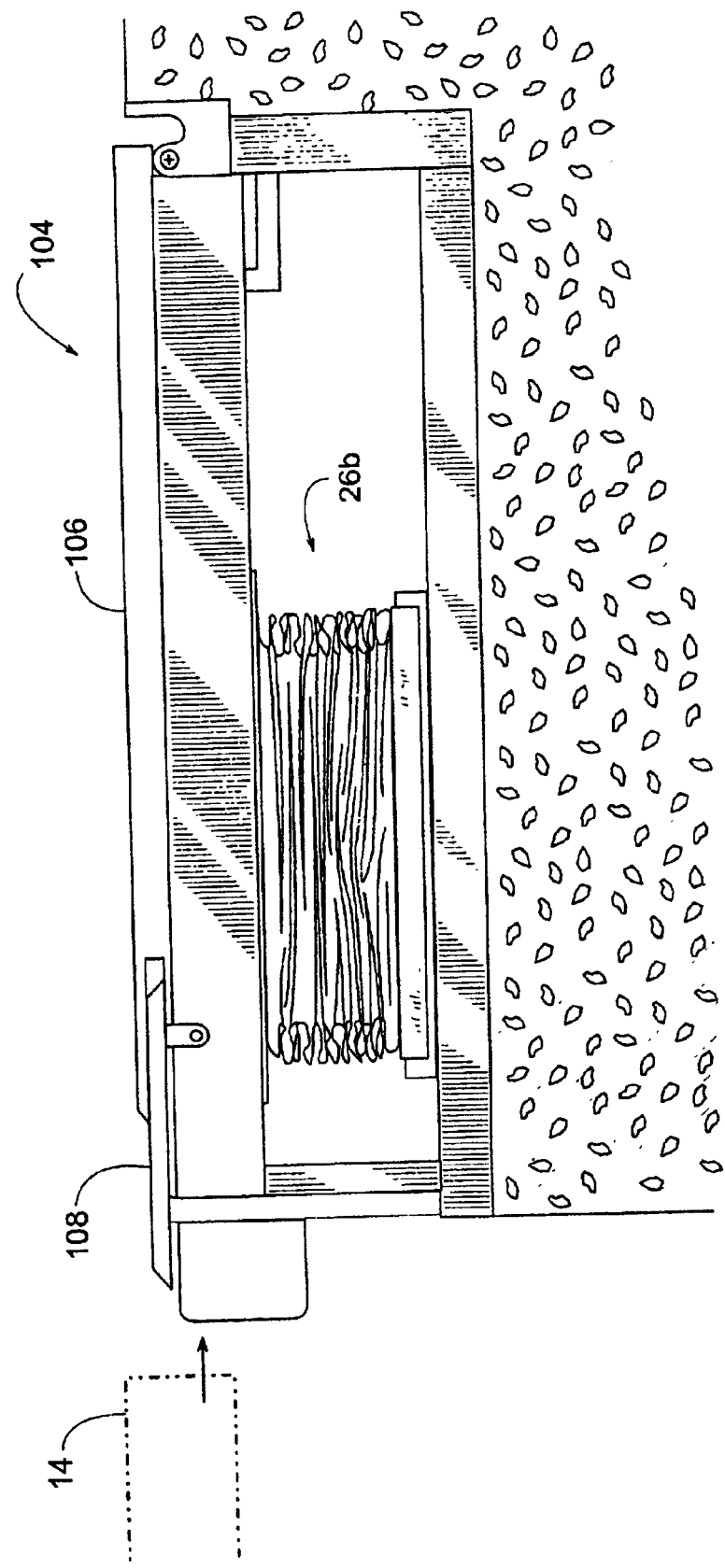
FIG. 8 is similar to FIG. 1, but showing a dock leveler with a sliding lip extension.
Figure 9:
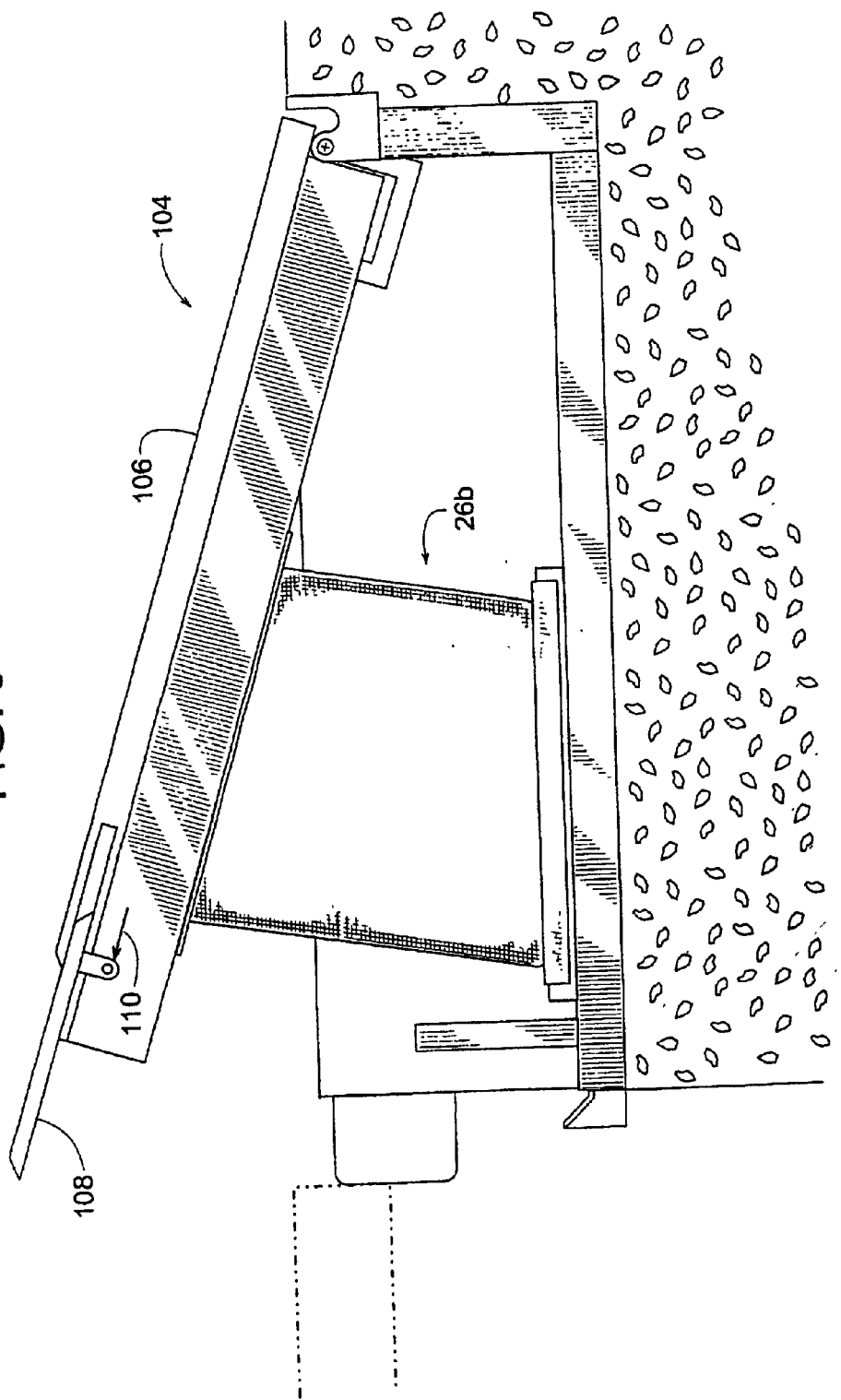
FIG. 9 is similar to FIG. 8, but with the inflatable column assembly inflated to lift the deck of the dock leveler.
Figure 10:
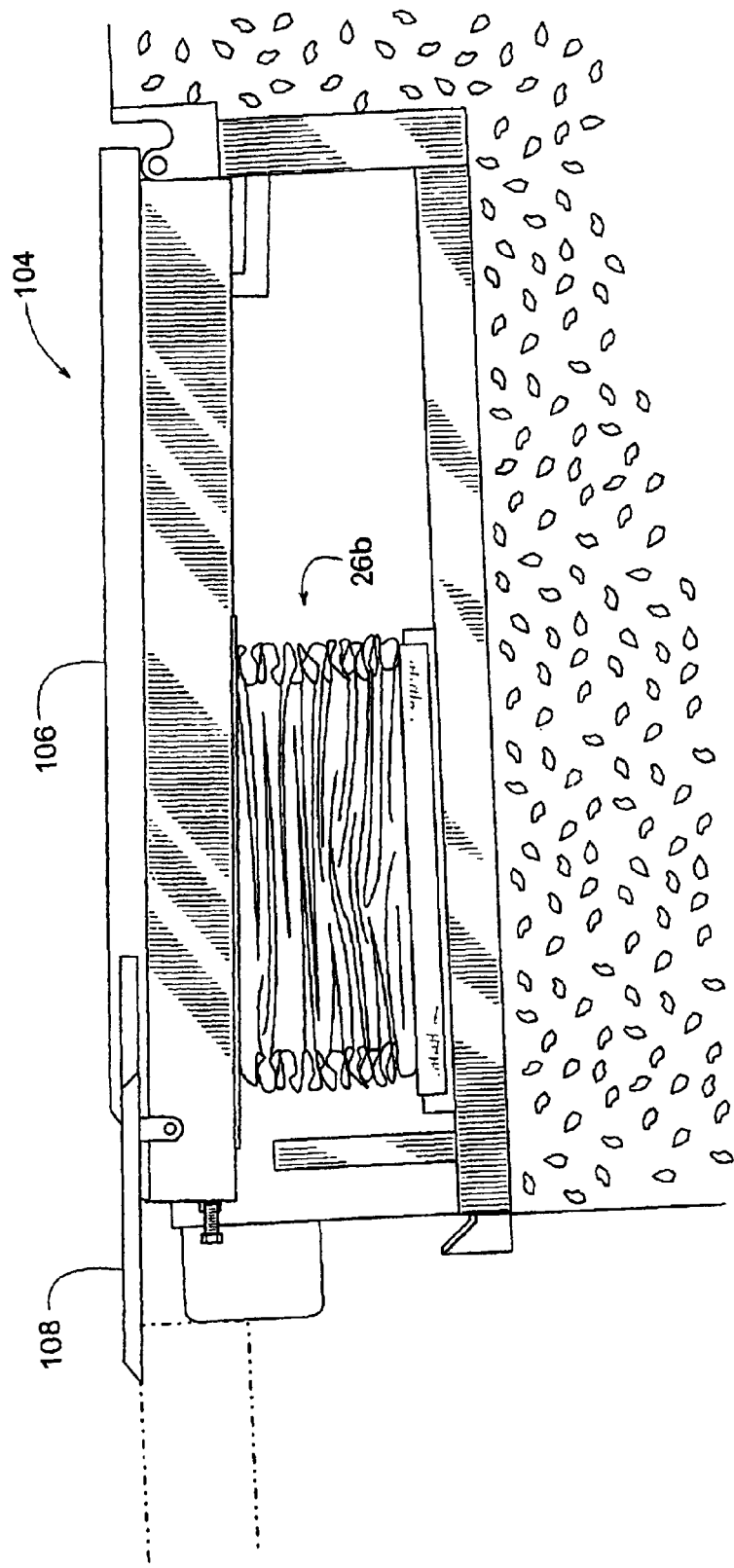
FIG. 10 is similar to FIG. 8, but with the deck of the dock leveler resting upon the rear of a truck bed.

In another embodiment, shown in FIGS. 8–10, an inflatable column assembly 26b operates a dock leveler 104 whose deck 106 includes a lip extension 108 that moves linearly relative to the deck. The function of inflatable column assembly 26b is generally the same as inflatable column assembly 26a, with FIGS. 8, 9 and 10 corresponding to FIGS. 1, 2 and 4, respectively. However, inflatable column assembly 26b is disposed at an angle when expanded, as shown in FIG. 9. Inflatable column assembly 26b in such a non-vertical orientation may be preferred in some applications. Arrow 110 of FIG. 9 is similar to arrow 42 of FIG. 2 in that both arrows schematically represent any actuator able to move lip 18 or 108. As mentioned earlier, examples of such a lip actuator include, but are not limited to, hydraulic cylinders, pneumatic cylinders, low-pressure air actuator, coil springs, high-pressure air springs, linear motors, mechanical linkages responsive to the movement of the deck, and various combinations thereof.

Figure 11:
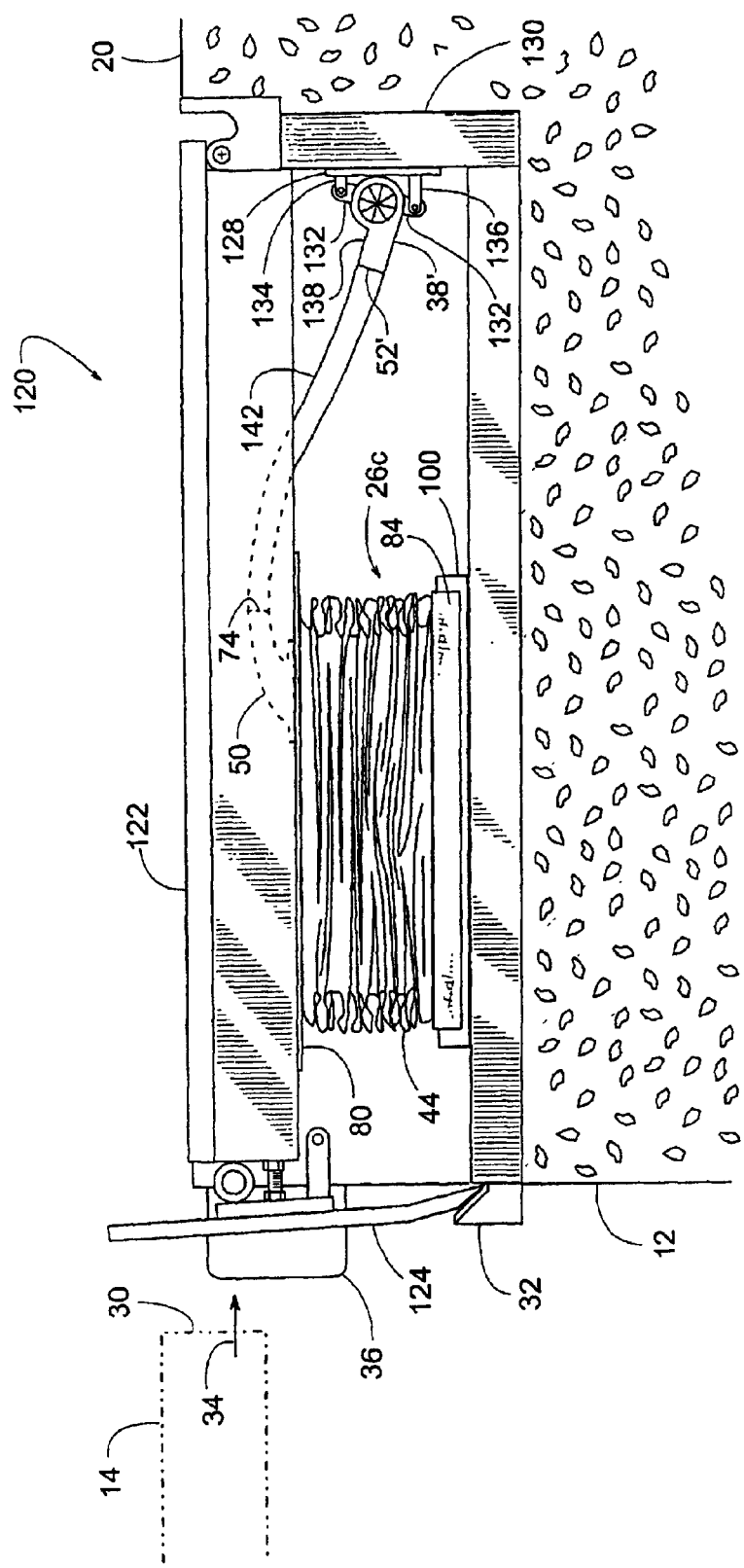
FIG. 11 is similar to FIG. 1, but showing a dock leveler with another type of lip extension.
Figure 12:
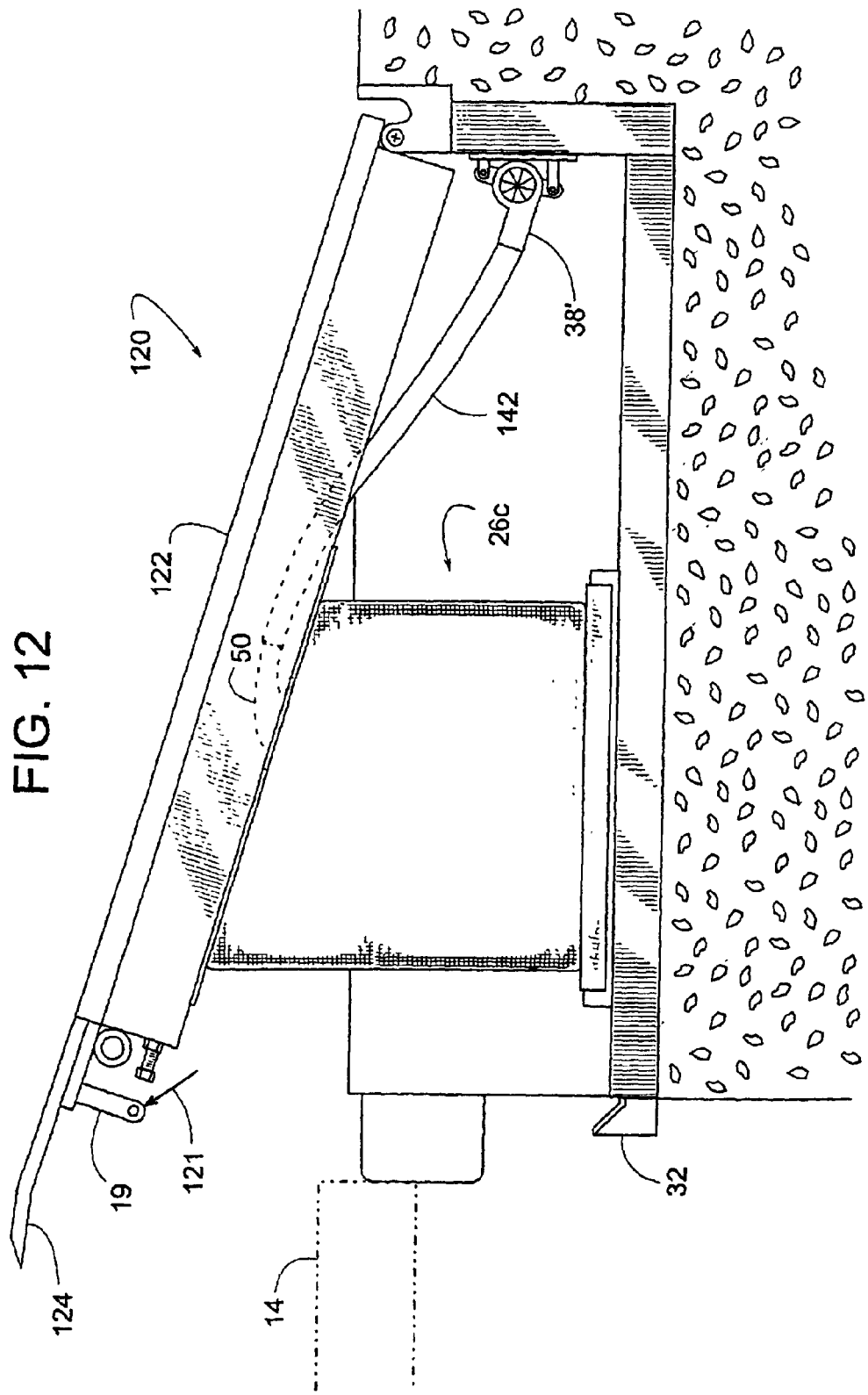
FIG. 12 is similar to FIG. 11, but with the inflatable column assembly inflated to lift the deck of the dock leveler.

In another embodiment, shown in FIGS. 11–13, an inflatable column assembly 26c operates a dock leveler 120 whose deck 122 includes a lip extension 124 that pivots and slides relative to the deck. Details of lip extension 124 can be found in U.S. Pat. No. 4,920,598, which is specifically incorporated by reference herein. In this embodiment, the structure and function of inflatable column assembly 26c is generally the same as inflatable column assembly 26a, wherein FIGS. 11, 12 and 13 correspond to FIGS. 1, 2 and 4, respectively. Arrow 121 of FIG. 12 is similar to arrow 42 of FIG. 2 in that both arrows schematically represent any actuator able to move lip 18 or 124. Examples of such a lip actuator include, but are not limited to, hydraulic cylinders, pneumatic cylinders, low-pressure air actuator, coil springs, high-pressure air springs, linear motors, mechanical linkages responsive to the movement of the deck, and various combinations thereof.

Inflatable column assembly 26c includes some unique features pertaining to its source of pressurized air. In particular, the source of pressurized air, e.g., a blower 38', is mounted at a substantially fixed location relative loading dock 12 and nozzle 50 is substantially fixed relative to deck 122. To mount blower 38', a steel plate 128 is welded or otherwise attached to a frame member 130 of dock leveler 120. Lugs 132 extending from blower 38' are fastened to tabs 134 and 136, which extend from plate 128. Plate 128 not only holds a housing 138 of blower 38' substantially stationary, but plate 128 also helps protect blower 38' from impact during installation or shipping of dock leveler 120. Typically, a dock leveler being installed is lifted by the forks of a fork truck inserted into the leveler from the rear, near the location of the blower 38'. The plate 128 protects the blower from direct impact from a penetrating fork, and may also prevent a lowered fork from being raised up and impacting the blower 38'. A strap clamp 140 (see detail in FIG. 14) attaches nozzle 50 to a bracket 101 mounted to the underside of the deck as shown in FIG. 14. Bracket 101 may also be attached to other structure associated with deck 122. Strap clamp 140 extends around nozzle 50, and a fastener 141 attaches strap clamp 140 to bracket 101.

To accommodate the pivotal movement of deck 122, a flexible tubular member 142 (e.g., a hose) couples an outlet 52' of blower 38' to inlet 74 of nozzle 50. As deck 122 pivots to its positions of FIGS. 11–13, the flexibility of tubular member 142 maintains outlet 52' in fluid communication with inlet 74. Otherwise, the functions of inflatable column assembly 26c, blower 38', tubular member 142, and nozzle 50 (of dock leveler 120) are the same as inflatable column assembly 26a, blower 38, tubular member 48 and nozzle 50 (of dock leveler 10), respectively.

Figure 15:
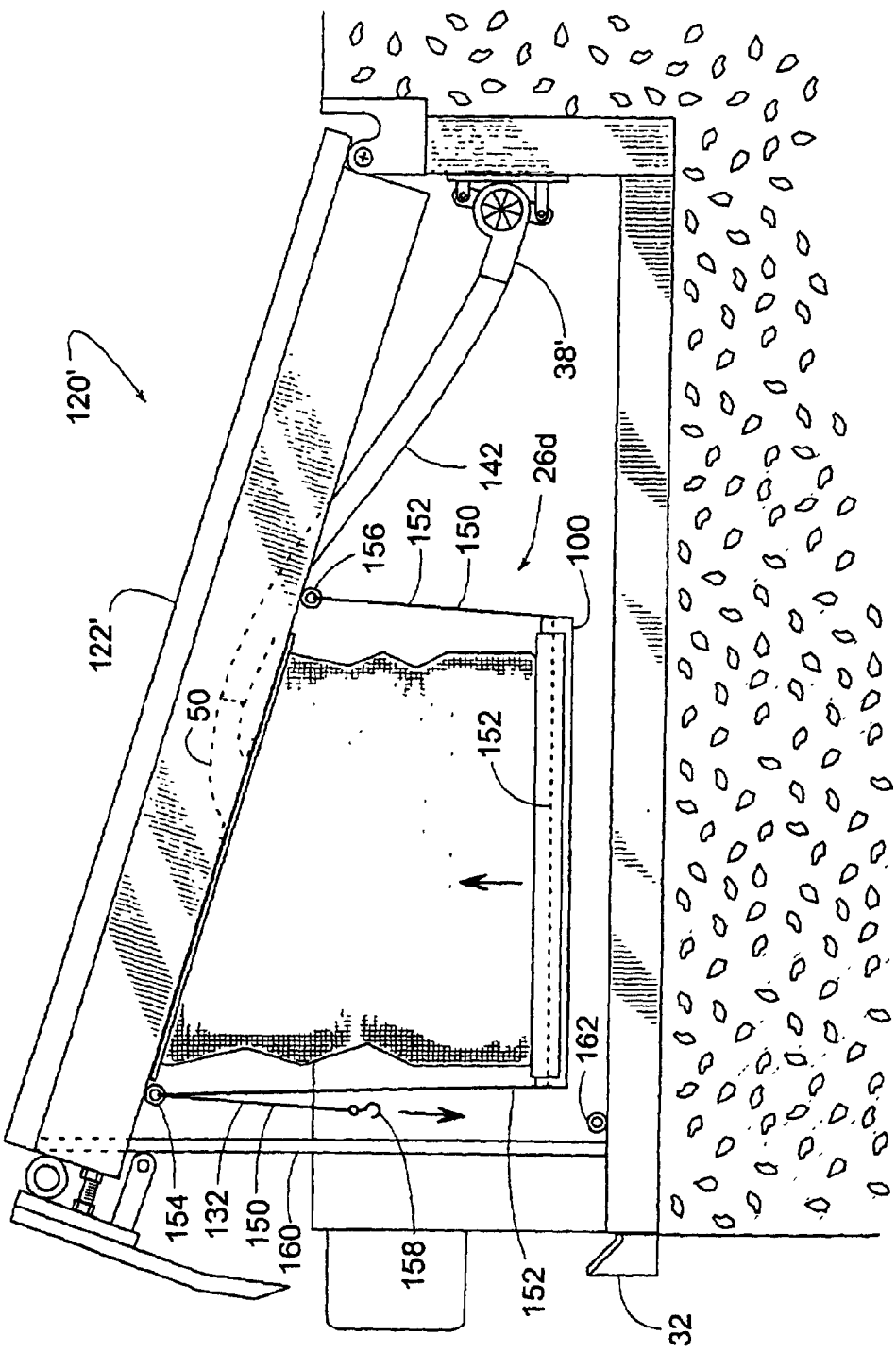
FIG. 15 is a side view of an inflatable column assembly that includes a hanger for lifting a lower portion of the column assembly.
Figure 16:
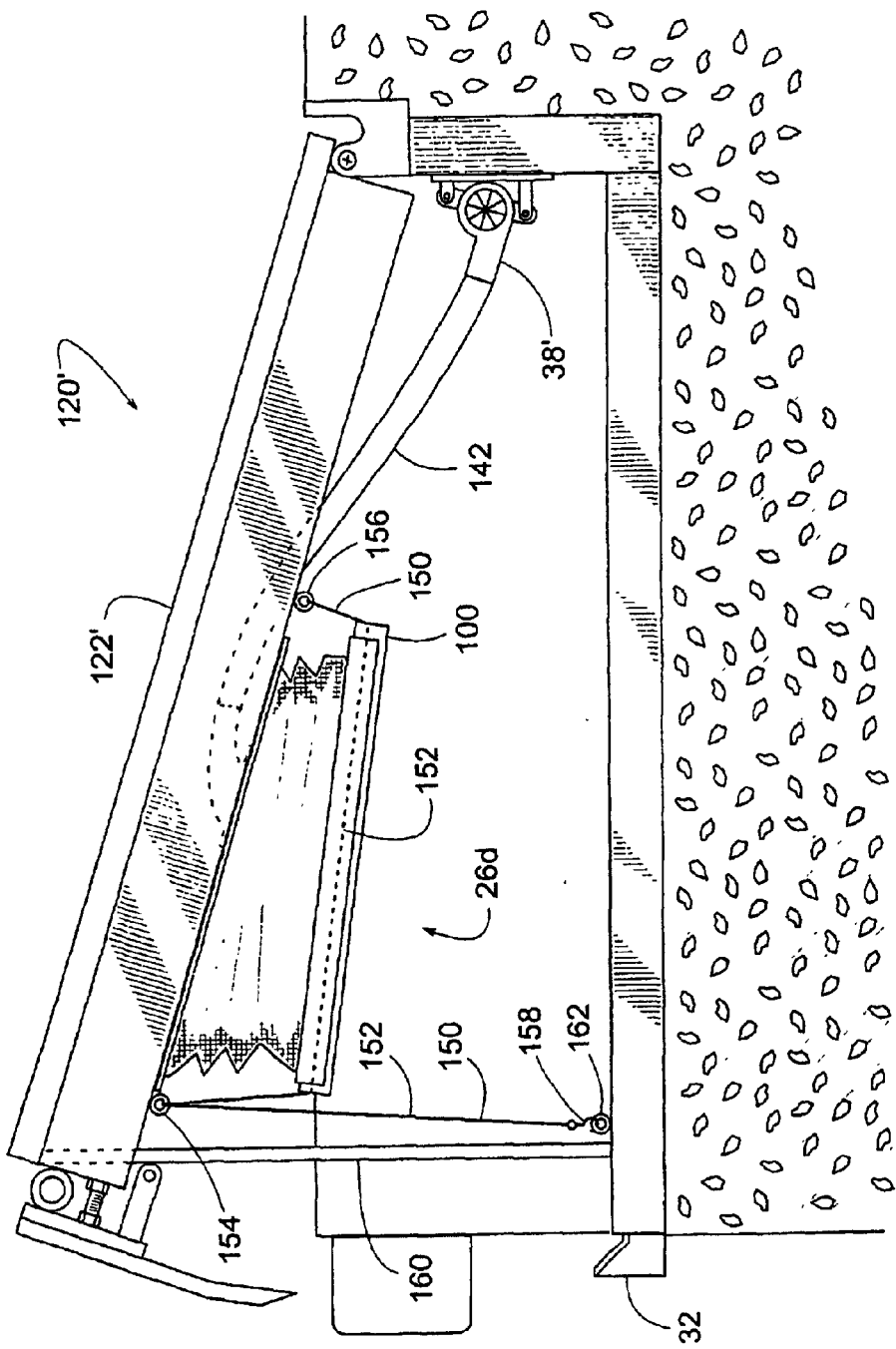
FIG. 16 is similar to FIG. 15, but showing the lower portion of the inflatable column assembly in a raised position.

To facilitate cleaning or otherwise servicing, a dock leveler 120' can be provided with one or more hangers 150, as shown in FIGS. 15 and 16. The term, "hanger" refers to any device for holding a lower portion of an inflatable column assembly at a raised position. Hanger 150, for example, may comprise at least one rope 152 (or any other type of pliable elongate member, such as a cable, strap, chain, wire, etc.) that slips underneath pallet 100 and feeds through an eyebolt 154 connected to a deck 122'. Rope 152 may be situated between two feet or pads underneath pallet 100, or may feed through a tube attached to the underside of pallet 100, or feed through a horizontal hole drilled through the pads or feet of pallet 100. A second eyebolt 156 anchors one end of rope 152 to another point on deck 122', and a hook 158 is at a free end of rope 152. To raise pallet 100 of an inflatable column assembly 26d, blower 38' is energized to raise deck 122', a prop 160 (e.g., rigid pipe, bar, brace, etc.) is inserted underneath deck 122', blower 38' is de-energized to allow the weight of deck 122' to rest upon prop 160, and the free end of rope 152 is manually pulled down to hoist pallet 100 in a cradle-like lifting arrangement. To facilitate raising the somewhat wide pallet, two separate ropes or pliable members may be provided underneath opposite edges of the pallet. In addition, a mechanical winch or other power-assist device could be mounted on or adjacent the deck or other structure to facilitate lifting of the pallet by a rope or ropes 152. A hanger structure like the one described could also be used to secure the inflatable column assembly to the underside of the deck for shipping of the dock leveler.

To keep pallet 100 at a raised position, hook 158 can be inserted into a stationary eyebolt 162, as shown in FIG. 16. Eyebolt 162 may be attached to a stationary portion of dock leveler 120', as shown, or may be attached at another location, such as on deck 122". When eyebolt 162 is attached to a front edge of deck 122", eyebolt 162 is preferably placed at a significant distance away from eyebolt 154. As an alternative to hook 158 engaging eyebolt 162, hook 158 can be eliminated and the free end of rope 152 can be tied to eyebolt 162 or wrapped about a cleat instead of an eyebolt.

To facilitate shipping a dock leveler 120", banding 164 can be used to temporarily hold an inflatable column member 26e tightly up against the underside of a deck 122", as shown in FIGS. 17 and 18. In these examples, conventional shipping banding 164 wraps completely around deck 122" and a pallet 100' of column member 26e. While the banding has been shown in the drawings as extending cross-wise to the leveler, it could also extend around the leveler length-wise. Having inflatable column member 26e already connected to dock leveler 120" can reduce the time it takes to set up the dock leveler at the installation site. The banding, of course, is removed before operating dock leveler 120". FIG. 18 illustrates the basic concept of banding just deck 122" and column member 26e together, and FIG. 17 illustrates that any number of additional dock leveler components may remain connected with deck 122" or column member 26e.

Although the invention is described with respect to a preferred embodiment, modifications thereto will be apparent to those skilled in the art. Therefore, the scope of the invention is to be determined by reference to the claims that follow.

We claim:

1. A dock leveler adapted to engage a vehicle at a loading dock, comprising:

a deck having a rear edge and a forward edge, wherein the rear edge is adapted to be pivotally coupled to the loading dock to enable vertical movement of the forward edge relative to the loading dock;

a lip extension adjacent the forward edge of the deck and being moveable relative thereto, the lip extension being adapted to engage the vehicle;

an inflatable column assembly disposed underneath the deck, wherein the inflatable column assembly includes a pliable tube having an upper perimetric seam defining an upper end adjacent the deck and moveable therewith, a lower perimetric seam defining a lower end disposed below the upper end, and a longitudinal seam running from the upper perimetric seam to the lower perimetric seam, wherein the pliable tube includes a front surface that is closer to the forward edge of the deck than is the longitudinal seam; and a source of pressurized air coupled to the inflatable column assembly such that air discharged from the source of pressurized air expands the inflatable column assembly, thereby forcing the upper end to push the deck upward.

2. The dock leveler of claim 1, wherein the pliable tube is substantially cylindrical when expanded.

3. The dock leveler of claim 1, wherein the upper perimetric seam and the lower perimetric seam are substantially equal in length.

4. The dock leveler of claim 1, wherein the upper perimetric seam is longer than the lower perimetric seam.

5. The dock leveler of claim 4, wherein the upper perimetric seam is generally elliptical.

6. The dock leveler of claim 1, further comprising a nozzle that couples the source of pressurized air to the inflatable column assembly, wherein the nozzle defines an air passageway that provides a diverging flow pattern of air discharged from the source of pressurized air.

7. The dock leveler of claim 6, wherein the air passageway extends along a curved centerline that defines an obtuse angle.

8. The dock leveler of claim 1, wherein the lip extension is linearly moveable relative to the deck.

9. The dock leveler of claim 1, wherein the source of pressurized air is fixed relative to the pivotal deck.

10. The dock leveler of claim 1, further comprising a flexible tube that couples the source of pressurized air to the inflatable column.

11. A dock leveler adapted to engage a vehicle at a loading dock, comprising:

a deck having a rear edge and a forward edge, wherein the rear edge is adapted to be pivotally coupled to the loading dock to enable vertical movement of the forward edge relative to the loading dock;
a lip extension adjacent the forward edge of the deck and being moveable relative thereto, the lip extension being adapted to engage the vehicle;
an inflatable column assembly disposed underneath the deck, wherein the inflatable column assembly includes a pliable tube having an upper perimetric seam defining an upper end adjacent the deck and moveable therewith, a lower perimetric seam defining a lower end disposed below the upper end, and a longitudinal seam running from the upper perimetric seam to the lower perimetric seam;
a source of pressurized air coupled to the inflatable column assembly such that air discharged from the source of pressurized air expands the inflatable column assembly, thereby forcing the upper end to push the deck upward; and
a deck hinge adapted to pivotally couple the rear edge of the deck to the loading dock, wherein the source of pressurized air is pivotally connected to the deck hinge, such that the source of pressurized air is pivotal independent of the deck.

12. A dock leveler adapted to engage a vehicle at a loading dock, comprising:
a deck having a rear edge and a forward edge, wherein the rear edge is adapted to be pivotally coupled to the loading dock to enable vertical movement of the forward edge relative to the loading dock;
a lip extension adjacent the forward edge of the deck and being moveable relative thereto, the lip extension being adapted to engage the vehicle;
an inflatable column assembly disposed underneath the deck, wherein the inflatable column assembly includes a pliable tube having an upper perimetric seam defining an upper end adjacent the deck and moveable therewith, a lower perimetric seam defining a lower end disposed below the upper end, and a longitudinal seam running from the upper perimetric seam to the lower perimetric seam;
a source of pressurized air coupled to the inflatable column assembly such that air discharged from the source of pressurized air expands the inflatable column assembly, thereby forcing the upper end to push the deck upward; and
an upper pliable sheet lying underneath and substantially parallel to the deck and having an outer perimeter that is larger than the upper perimetric seam, wherein the upper pliable sheet couples the pliable tube to the deck.

13. The dock leveler of claim 12, wherein the upper perimetric seam connects the pliable tube to the upper pliable sheet.

14. The dock leveler of claim 12, wherein the pliable tube includes a pliable flange with a series of outwardly extending tabs and at least one of the upper perimetric seam and the lower perimetric seam is disposed on the pliable flange.

15. The dock leveler of claim 12, wherein the upper pliable sheet is in tension.

16. A dock leveler adapted to engage a vehicle at a loading dock, comprising:
a deck having a rear edge and a forward edge, wherein the rear edge is adapted to be pivotally coupled to the loading dock to enable vertical movement of the forward edge relative to the loading dock;
a lip extension adjacent the forward edge of the deck and being moveable relative thereto, the lip extension being adapted to engage the vehicle;
an inflatable column assembly disposed underneath the deck, wherein the inflatable column assembly includes a pliable tube having an upper perimetric seam defining an upper end adjacent the deck and moveable therewith, a lower perimetric seam defining a lower end disposed below the upper end, and a longitudinal seam running from the upper perimetric seam to the lower perimetric seam;
a source of pressurized air coupled to the inflatable column assembly such that air discharged from the source of pressurized air expands the inflatable column assembly, thereby forcing the upper end to push the deck upward; and
a footed pallet coupled to the pliable tube and being adapted to slideably rest upon a fixed surface underneath the deck.

17. The dock leveler of claim 16, wherein the fixed surface is underneath the dock leveler.

18. The dock leveler of claim 16, wherein the footed pallet is adapted to be lifted from the fixed surface to a raised position.

19. The dock leveler of claim 18, further comprising a hanger connectable to the deck and the footed pallet, whereby the hanger is able to hold the footed pallet at the raised position.

20. The dock leveler of claim 16, further comprising a shipping band removably connected to the deck and the footed pallet, wherein the shipping band draws the footed pallet toward the deck.

21. The dock leveler of claim 16, further comprising a lower pliable sheet that the lower perimetric seam connects to the pliable tube, wherein the lower pliable sheet is attached to the footed pallet.

22. A dock leveler adapted to engage a vehicle at a loading dock, comprising:
a deck having a rear edge and a forward edge, wherein the rear edge is adapted to be pivotally coupled to the loading dock to enable vertical movement of the forward edge relative to the loading dock;
a lip extension adjacent the forward edge of the deck and being moveable relative thereto, the lip extension being adapted to engage the vehicle;
an inflatable column assembly disposed underneath the deck, wherein the inflatable column assembly includes a pliable tube having an upper perimetric seam defining an upper end adjacent the deck and moveable therewith, a lower perimetric seam defining a lower end disposed below the upper end, and a longitudinal seam running from the upper perimetric seam to the lower perimetric seam;
a source of pressurized air coupled to the inflatable column assembly such that air discharged from the source of pressurized air expands the inflatable column assembly, thereby forcing the upper end to push the deck upward; and
a lower pliable sheet that the lower perimetric seam connects to the pliable tube.

23. A dock leveler adapted to engage a vehicle at a loading dock, comprising;
a deck having a rear edge and a forward edge, wherein the rear edge is adapted to be pivotally coupled to the loading dock to enable vertical movement of the forward edge relative to the loading dock;
a lip extension adjacent the forward edge of the deck and being moveable relative thereto, the lip extension being adapted to engage the vehicle;

an upper pliable sheet disposed underneath the deck and attached thereto such that the upper pliable sheet is held in tension;

a pliable tube attached to the upper pliable sheet along an upper perimetric seam, wherein the upper perimetric seam has a length that is less than an outer peripheral length of the upper pliable sheet; and a source of pressurized air in fluid communication with an interior of the pliable tube such that air discharged from the source of pressurized air expands the pliable tube to push the deck upward.

24. The dock leveler of claim 23, wherein the pliable tube is substantially cylindrical when expanded.

25. The dock leveler of claim 23, wherein the upper perimetric seam is generally elliptical.

26. The dock leveler of claim 23, further comprising a nozzle that couples the source of pressurized air to an interior volume of the pliable tube, wherein the nozzle defines an air passageway that provides a diverging flow pattern of air discharged from the source of pressurized air.

27. The dock leveler of claim 26, wherein the air passageway extends along a curved centerline that defines an obtuse angle.

28. The dock leveler of claim 23, further comprising a deck hinge adapted to pivotally couple the rear edge of the deck to the loading dock, wherein the source of pressurized air is pivotally connected to the deck hinge.

29. The dock leveler of claim 23, wherein the lip extension is linearly moveable relative to the deck.

30. The dock leveler of claim 23, wherein the upper pliable sheet couples the pliable tube to the deck.

31. The dock leveler of claim 23, wherein the pliable tube includes a pliable flange with a series of outwardly extending tabs and the upper perimetric seam is disposed on the pliable flange.

32. The dock leveler of claim 23, wherein the source of pressurized air remains at a substantially fixed location.

33. The dock leveler of claim 23, further comprising a flexible tube that couples the source of pressurized air to an interior volume of the pliable tube.

34. The dock leveler of claim 23, further comprising a footed pallet coupled to the pliable tube and being adapted to slideably rest upon a fixed surface underneath the deck.

35. The dock leveler of claim 34, wherein the fixed surface is underneath the dock leveler.

36. The dock leveler of claim 34, wherein the footed pallet is adapted to be lifted from the fixed surface to a raised position.

37. The dock leveler of claim 36, further comprising a hanger connectable to the deck and the footed pallet, whereby the hanger is able to hold the footed pallet at the raised position.

38. The dock leveler of claim 34, further comprising a shipping band removably connected to the deck and the footed pallet, wherein the shipping band draws the footed pallet toward the deck.

39. The dock leveler of claim 34, further comprising a lower pliable sheet that the lower perimetric seam connects to the pliable tube, wherein the lower pliable sheet is attached to the footed pallet.

40. The dock leveler of claim 23, further comprising a lower pliable sheet that the lower perimetric seam connects to the pliable tube.

41. A dock leveler adapted to engage a vehicle at a loading dock, comprising:

a deck having a rear edge and a forward edge, wherein the rear edge is adapted to be pivotally coupled to the loading dock to enable vertical movement of the forward edge relative to the loading dock;

a lip extension adjacent the forward edge of the deck and being moveable relative thereto, the lip extension being adapted to engage the vehicle;

an inflatable column assembly disposed underneath the deck, wherein the inflatable column assembly includes a pliable tube that is substantially cylindrical when expanded, an upper surface that is substantially elliptical, and a lower surface that is substantially round, wherein the upper surface is on an upper pliable sheet that couples the pliable tube to the deck; and a source of pressurized air coupled to the inflatable column assembly such that air discharged from the source of pressurized air expands the inflatable column assembly to push the deck upward.

42. The dock leveler of claim 41, further comprising a nozzle that couples the source of pressurized air to an interior volume of the pliable tube, wherein the nozzle defines an air passageway that provides a diverging flow pattern of air discharged from the source of pressurized air.

43. The dock leveler of claim 42, wherein the air passageway extends along a curved centerline that defines an obtuse angle.

44. The dock leveler of claim 41, wherein the lip extension is linearly moveable relative to the deck.

45. The dock leveler of claim 41, wherein the pliable tube includes a pliable flange with a series of outwardly extending tabs.

46. The dock leveler of claim 41, wherein the source of pressurized air remains at a substantially fixed location.

47. The dock leveler of claim 41, further comprising a flexible tube that couples the source of pressurized air to the inflatable column assembly.

48. A dock leveler adapted to engage a vehicle at a loading dock, comprising:

a deck having a rear edge and a forward edge, wherein the rear edge is adapted to be pivotally coupled to the loading dock to enable vertical movement of the forward edge relative to the loading dock;

a lip extension adjacent the forward edge of the deck and being moveable relative thereto, the lip extension being adapted to engage the vehicle;

an inflatable column assembly disposed underneath the deck, wherein the inflatable column assembly includes a pliable tube that is substantially cylindrical when expanded, an upper surface that is substantially elliptical, and a lower surface that is substantially round, wherein the upper surface is on an upper pliable sheet that couples the pliable tube to the deck;

a source of pressurized air coupled to the inflatable column assembly such that air discharged from the source of pressurized air expands the inflatable column assembly to push the deck upward; and a deck hinge adapted to pivotally couple the rear edge of the deck to the loading dock, wherein the source of pressurized air is pivotally connected to the deck hinge, such that the source of pressurized air is pivotal independent of the deck.

49. A dock leveler adapted to engage a vehicle at a loading dock, comprising:

a deck having a rear edge and a forward edge, wherein the rear edge is adapted to be pivotally coupled to the loading dock to enable vertical movement of the forward edge relative to the loading dock;

a lip extension adjacent the forward edge of the deck and being moveable relative thereto, the lip extension being adapted to engage the vehicle;

an inflatable column assembly disposed underneath the deck, wherein the inflatable column assembly includes a pliable tube that is substantially cylindrical when expanded, an upper surface that is substantially elliptical, and a lower surface that is substantially round, wherein the upper surface is on an upper pliable sheet that couples the pliable tube to the deck;

a source of pressurized air coupled to the inflatable column assembly such that air discharged from the source of pressurized air expands the inflatable column assembly to push the deck upward; and a footed pallet coupled to the pliable tube and being adapted to slideably rest upon a fixed surface underneath the deck.

50. The dock leveler of claim 49, wherein the fixed surface is underneath the dock leveler.

51. The dock leveler of claim 49, wherein the footed pallet is adapted to be lifted from the fixed surface to a raised position.

52. The dock leveler of claim 51, further comprising a hanger connectable to the deck and the footed pallet, whereby the hanger is able to hold the footed pallet at the raised position.

53. The dock leveler of claim 49, further comprising a shipping band removably connected to the deck and the footed pallet, wherein the shipping band draws the footed pallet toward the deck.

54. A dock leveler adapted to engage a vehicle at a loading dock, comprising:

a deck having a rear edge and a forward edge, wherein the rear edge is adapted to be pivotally coupled to the loading dock to enable vertical movement of the forward edge relative to the loading dock;

a lip extension adjacent the forward edge of the deck and being moveable relative thereto, the lip extension being adapted to engage the vehicle;

an inflatable column assembly disposed underneath the deck, wherein the inflatable column assembly includes a pliable tube that is substantially cylindrical when expanded, an upper surface that is substantially elliptical, and a lower surface that is substantially round, wherein the lower surface is on a lower pliable sheet that connects the pliable tube to a footed pallet; and a source of pressurized air coupled to the inflatable column assembly such that air discharged from the source of pressurized air expands the inflatable column assembly to push the deck upward.

* * * * *

UNITED STATES PATENT AND TRADEMARK OFFICE
CERTIFICATE OF CORRECTION

| | | |
|---|---|---|
| PATENT NO. | : 7,062,814 B2 | Page 1 of 1 |
| APPLICATION NO. | : 10/140786 | |
| DATED | : June 20, 2006 | |
| INVENTOR(S) | : Bender et al. | |

It is certified that error appears in the above-identified patent and that said Letters Patent is hereby corrected as shown below:

Col. 9, line 55 After "perimetric" delete "scam" and insert -- seam --.

Signed and Sealed this

Twenty-sixth Day of December, 2006

JON W. DUDAS
*Director of the United States Patent and Trademark Office*